United States Patent [19]
Schmidt

[11] 3,945,815
[45]*Mar. 23, 1976

[54] APPARATUS FOR DRAWING FIBERS BY FLUID MEANS

[75] Inventor: Warren H. D. Schmidt, Guelph, Canada

[73] Assignee: Fiberglas Canada Limited, Toronto, Canada

[ * ] Notice: The portion of the term of this patent subsequent to Nov. 20, 1990, has been disclaimed.

[22] Filed: Aug. 15, 1974

[21] Appl. No.: 497,718

Related U.S. Application Data

[60] Continuation of Ser. No. 385,576, Aug. 3, 1973, abandoned, which is a division of Ser. No. 237,992, March 24, 1972, Pat. No. 3,773,483, which is a continuation of Ser. No. 35,197, May 6, 1970, abandoned.

[52] U.S. Cl. .................................... 65/12; 425/66
[51] Int. Cl.² ........................................ C03B 37/02
[58] Field of Search ............. 65/2, 11 W, 5, 12, 16; 425/66

[56] References Cited
UNITED STATES PATENTS
3,697,241  10/1972  Strickland et al ...................... 65/2

*Primary Examiner*—Robert L. Lindsay, Jr.
*Attorney, Agent, or Firm*—Stevens, Davis, Miller & Mosher

[57] ABSTRACT

An apparatus is described for drawing at least one and preferably a multiplicity of continuous fibers through a drawing funnel. The drawing funnel is positioned with its inlet at a predetermined distance from the source from which monofilament is to be drawn. The funnel is provided with an aerodynamically smoothly converging inlet on an upstream section thereof. This converging inlet accelerates the flow of fluid, preferably air or other gaseous medium, and creates laminar flow of that fluid. Means are provided to establish a pressure differential over the length of the funnel and cause the fluid flow through the funnel. Laminar flow is utilized in the converging inlet and preferably over the length of the drawing funnel, to inhibit physical damage to the continuous fiber. The funnel inlet is located to insure that the fiber is fully solidified or finished, before a pulling force is exerted thereon. That pulling force is generated by friction of the moving stream of fluid in contact with the surface of the filament. The converging inlet accelerates the laminar flow of fluid to establish a velocity differential in which the fluid velocity exceeds the velocity of the continuous fiber. The velocity differential supports laminar flow throughout the drawing funnel, and generates the frictionally developed pulling force. Preferably, the converging inlet to the drawing funnel is positioned at a distance in the range from about 5 inches to about 15 inches from a source of heat-softened fiber forming material, preferably a glass or mineral composition. The drawing funnel is configured in one embodiment so as to provide substantially constant velocity of the fluid flow over the length of the drawing funnel. In another preferred embodiment of this apparatus, the drawing funnel is configured to have a substantially constant cross-sectional area over the length of that funnel. Further yet, the drawing funnel preferably has a rectangular slot-like cross-section to pass a multiplicity of individual fibers. A diffuser section normally is joined to the discharge end of the drawing funnel. This diffuser section decelerates the fluid flow and continuous fiber carried thereby, thus enabling collection of the attenuated fiber in a predetermined form, say on a collet, in a bucket, as a felted mat, or the like.

12 Claims, 14 Drawing Figures

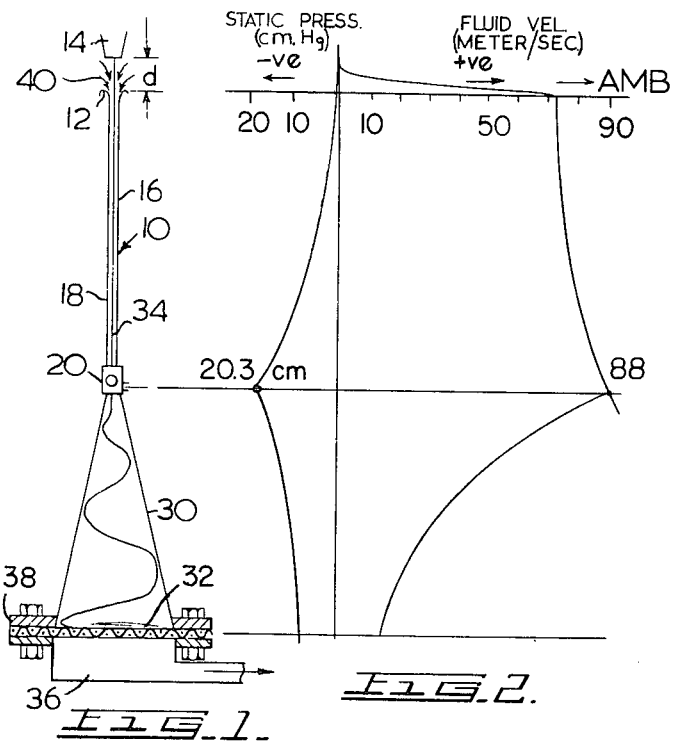
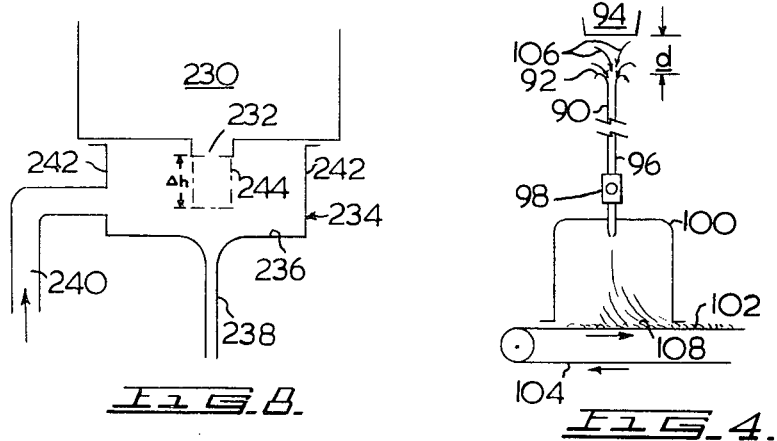

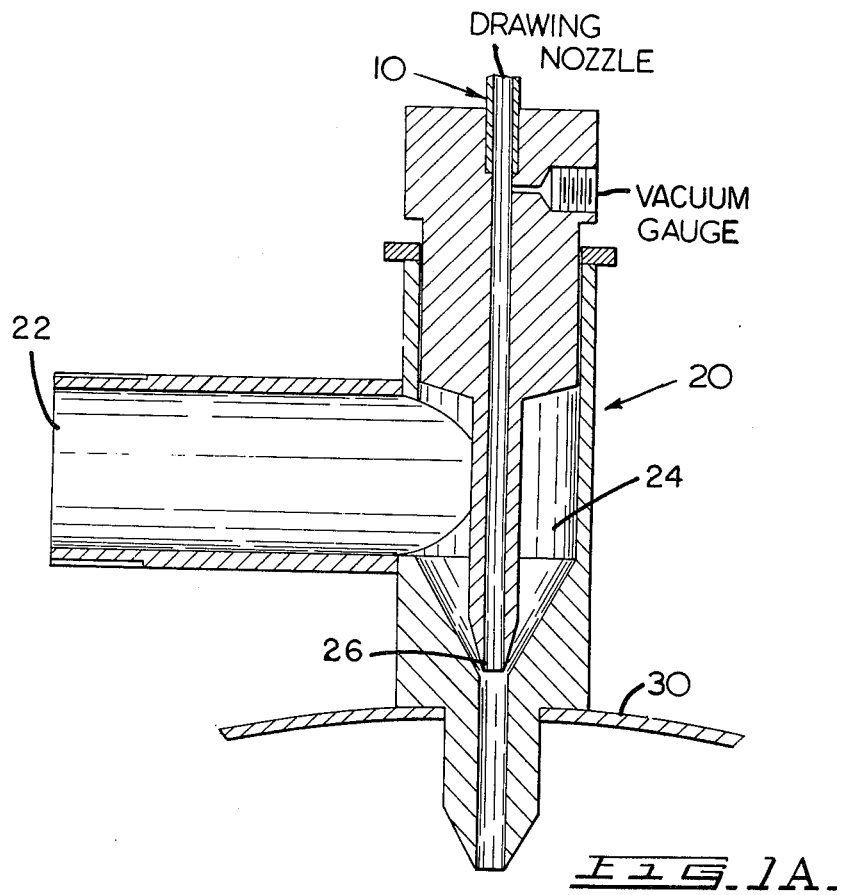

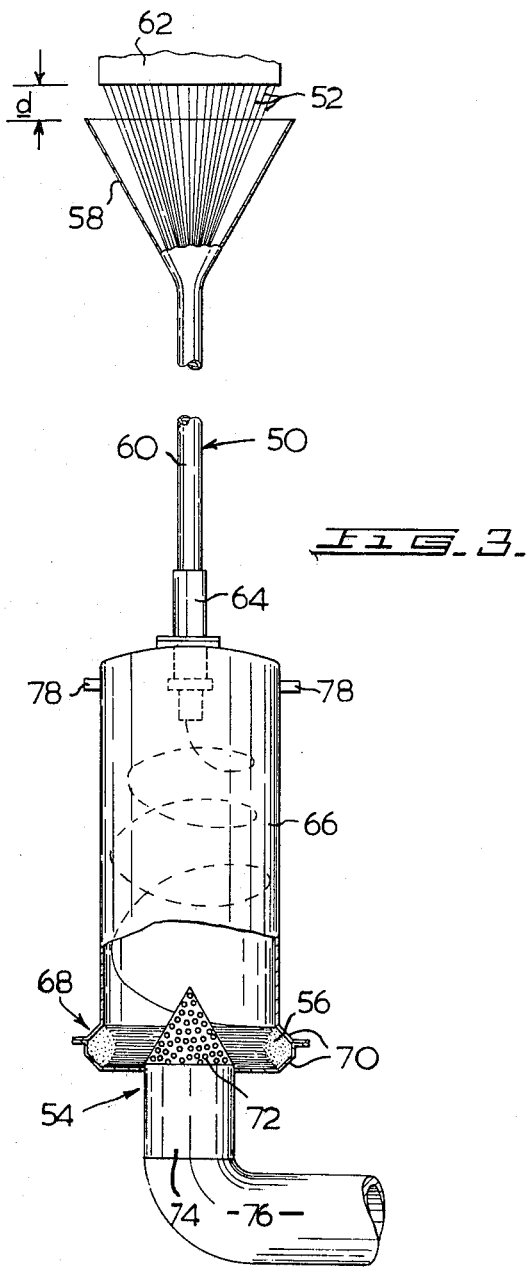

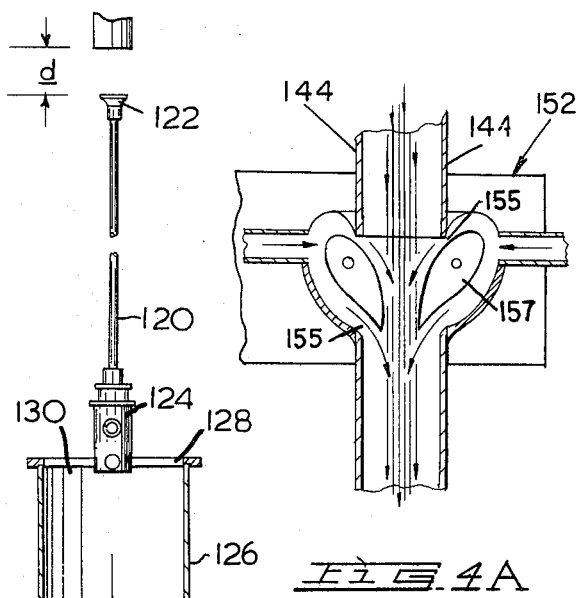
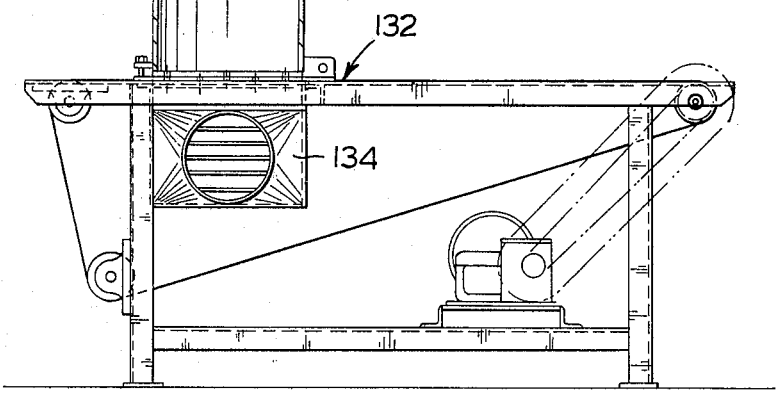
FIG.4A
FIG.5.

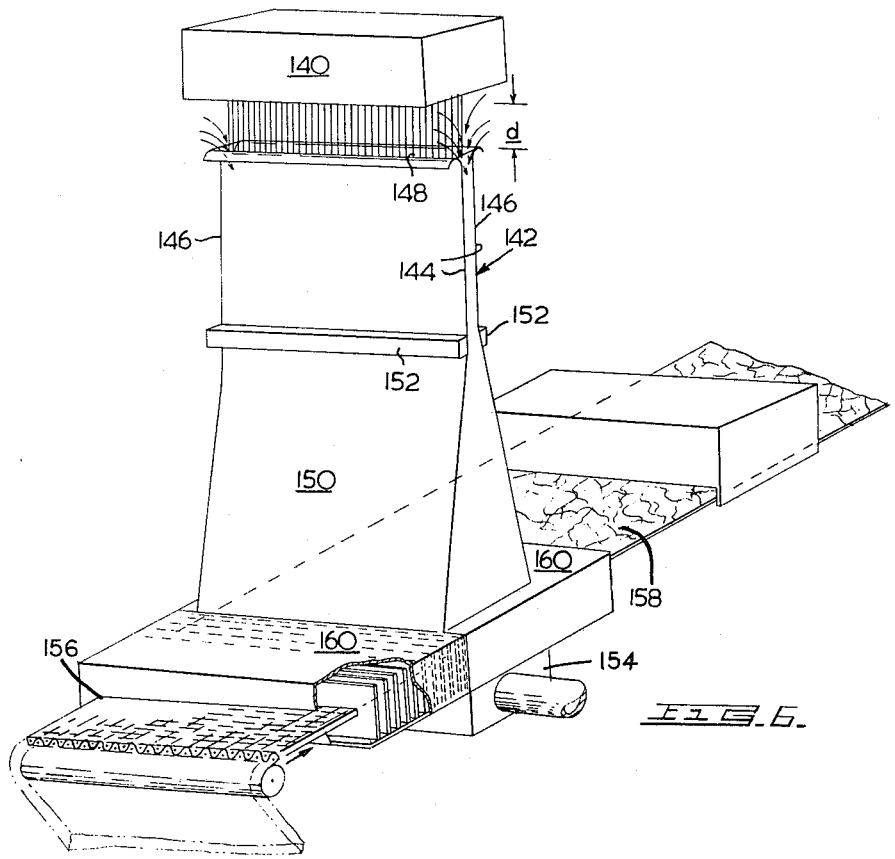

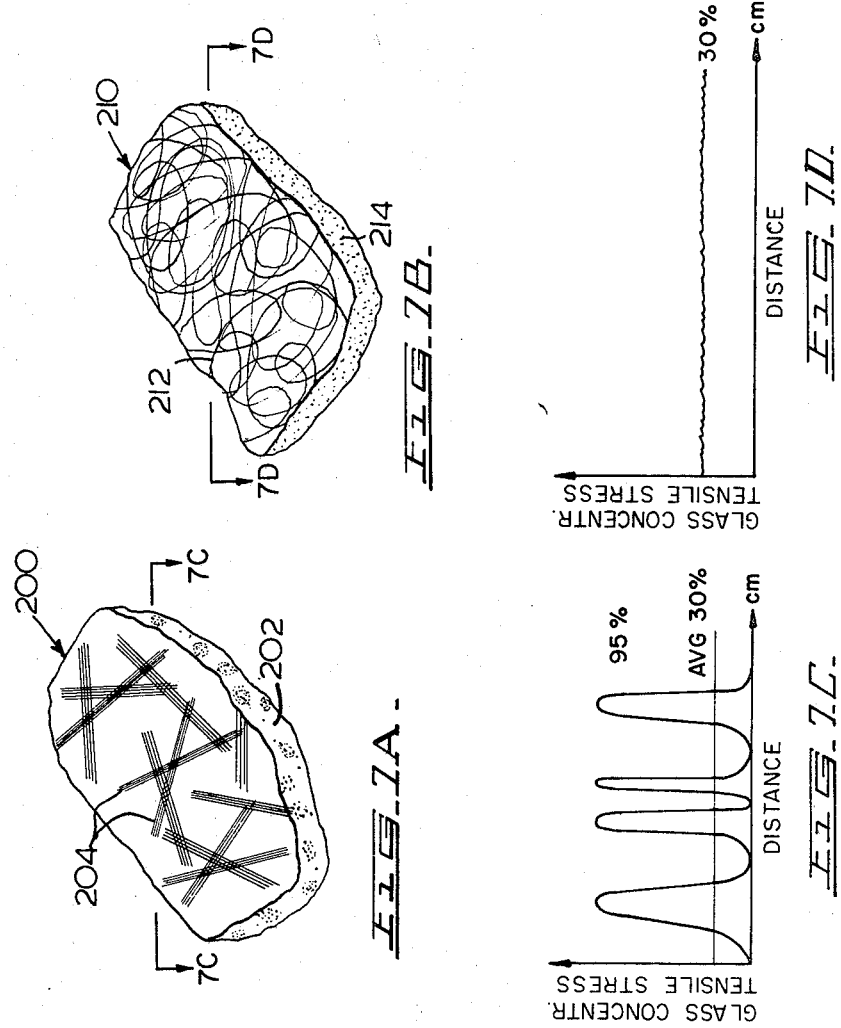

APPARATUS FOR DRAWING FIBERS BY FLUID MEANS

This application is a continuation of application Ser. No. 385,576, filed Aug. 3, 1973, now abandoned, which is a division of Ser. No. 237,992, filed Mar. 24, 1972, now U.S. Pat. No. 3,773,483, granted Nov. 20, 1973 which is a continuation of Ser. No. 35,197, filed May 6, 1970, now abandoned.

This invention relates broadly to a process and apparatus for drawing a continuous fiber or monofilament using a stream of a moving fluid to develop a pulling or drawing force on the fiber. More particularly, the invention relates to a self-starting process and apparatus for drawing a monofilament fiber of glass, an organic or inorganic material; and especially of a reinforcing type of fiber, and a textile fiber including a "Beta"*-type of fiber, without any mechanical or physical handing during formation of the continuous fiber. The continuous fiber or monofilament can be collected, for example, as a "cake" for use on a roving machine in the textile industry, or as a filamentized mat that is of particular use in the glass reinforced plastics industry or in any other industry where matrix material is to be reinforced.

*A registered Trade Mark of Owens-Corning Fiberglas Corporation

BACKGROUND OF THE INVENTION

It is known in the art to which this invention relates that a monofilament or continuous fiber refers to one single fiber. Several continuous fibers when taken together are considered as a strand, and if cut to discrete lengths of staple fibers, become chopped strand from which a chopped strand mat can be made. A plurality of continuous filaments can also be referred to as yarns, especially if some twist of the individual filaments is involved. Yarns generally have reference to the textile industry. Also, if a plurality of continuous filaments are considered, in which the filaments are generally parallel to one another then those filaments are collectively referred to as rovings.

With that introductory explanation, it will be recognized in this art that staple fibers of glass, for instance, can be produced in strands, cut to a discrete length and formed into a chopped strand mat structure to which a binder or sizing agent can be applied, if necessary. This chopped strand mat structure can then have a resinous material added to it when it has been placed in a mold, with the chopped strand mat structure thus being "wetted out" i.e., having the chopped strands coated with some of the resin. Following heating and curing of the resin coated mat structure, an article can be produced as a sheet, a shell or any other form. Such an article can then be used, for example, in the transportation, construction or other related industries where glass reinforced plastics in the form of panels, or other molded parts are frequently used. At present, those industries in which a matrix material is to be reinforced most frequently make use of a chopped strand mat structure that is made from a roving. Since a strand from which such a chopped strand mat structure is made generally consists of hundreds of filaments, the resulting mat structure is relatively coarse. As a result, significant difficulties are encountered, for instance, in using such a chopped strand mat structure in connection with coating or "wetting out" the chopped strands and staple fibers with a matrix material, uniformly, so as to provide a homogeneous distribution of the glass fibers in the resulting structure. This matrix material could be a polyester, an epoxy, a phenol or other such resinous material. In other words, difficulties have previously been encountered in achieving a glass load uniformly within the matrix material. In one of the processes currently being used to produce rolled chopped strand matting for the glass reinforced plastics industry, a relatively large number of operating personnel are required to perform all of the necessary operations that are involved. Moreover, the equipment can occupy considerable volumes of space and this involves large capital expenditures in building and maintenance costs. Briefly then, prior art processes used for producing a chopped strand mat structure for those industries requiring matrix material to be reinforced, have been subject to certain problems.

It is also well known in the art to which this invention relates that superfine textile filaments have been produced by methods which have not been economically attractive. These superfine filaments are relatively thin, being of the order of about 10/100,000 of an inch in diameter. Consequently, they are rather delicate and fragile, and are prone to breakage when they are physically handled. It is primarily because of the hazard for breakage that accompanies physical contact of the fibers by mechanical equipment, that has resulted in the industry being unable to achieve production which is as economically attractive as one would like.

SUMMARY

The self-starting process and apparatus comprehended by the present invention significantly improves upon many of the inadequacies of prior art arrangements. The apparatus and process described below is versatile in its scope of application, due at least in part to the relative simplicity of the same. Some specific forms of apparatus that can be used to carry out the present process will be described below, and certain modifications thereto will also be suggested. In accordance with the process described herein we have discovered that by ensuring that the fiber is fully solidified, i.e., finished or cooled, before a pulling force is exerted thereon, a continuous fiber or monofilament can be drawn at speeds which extend over a wide range, and with a dramatically reduced risk of breakage in all cases. This pulling force is generated by the skin friction which develops when a moving stream of a fluid (be it liquid, gaseous or a vapor) contacts the surface of the fiber. Moreover, the drawing speeds involved are very much higher than has previously been thought possible in the production of superfine textile filaments. We have found unexpectedly that by ensuring that the fluid flow is laminar at least when it initially contacts the fiber to be drawn, drawing speeds of up to about 500 feet per second were achieved under experimental conditions. It is fully expected that within the spirit of this invention these drawing speeds can be increased even more, to the extend of being up to about 0.9 Mach. That is to say, it is thought possible to use the process described herein to draw continuous fibers at speeds of up to about 90% of the speed of sound.

In a broad sense, therefore, we have discovered a self-starting process for drawing a continuous fiber or monofilament from a supply of viscous liquid through a calibrated orifice by the steps of forming a laminar flow in a moving screen of fluid, and introducing the fiber into that moving stream at a predetermined distance from the calibrated orifice such that the fiber is fully solidified and formed before a frictionally generated pulling force is applied to the fiber, whereby said fiber is drawn into a continuous fiber or monofilament without any physical or mechanical handling of the same. We have found that a monofilament or continuous fiber drawn in such a process has a diameter which, for all practical purposes, is constant; but which diameter can be varied by making certain adjustments to the apparatus or its operating conditions. We have also found that this process is particularly suitable for the very high drawing speeds required for the economical production of "Beta" or other types of textile fibers. The apparatus and self-starting process contemplated here are expected to be readily adaptable for use in drawing monofilament or continuous fibers from many materials currently being used in the textile industry, for example, nylon, rayon, viscose and so on; as well as being especially suited for drawing continuous fibers of glass. The rate at which the monofilament or continuous fiber is drawn can be varied (a) by changing the velocity of the moving stream of fluid; (b) by altering the diameter of the calibrated orifice (or as it is known in the glass-making industry, the "bushing" orifice) from which the fiber is initially drawn; (c) by varying the viscosity of the liquid at the source, from which the fiber is made; or (d) by various combinations thereof. Preferably, the fluid which is used in the present process is a gas or vapour, commonly air, although steam or some other vapor or gas could also be used, so long as the vapour or gas is chemically inert relative to the material of which the continuous fiber is made.

It is an object of this invention, therefore, to provide a new and improved process and apparatus wherein continuous or monofilament fibers can be drawn at high speeds and involving a minimum of physical contact with mechanical devices. The present process is self-starting as opposed to prior art processes which require manual assistance at start-up.

It is also an object of this invention to provide a process and apparatus wherein a moving stream of a fluid generates the force required for drawing the monofilament fiber, by frictional contact therewith, this force eliminating the necessity of mechanical handling of the delicate monofilament during formation of the same.

It is also an object of one particular aspect of this invention to enable continuous reinforcing textile and preferably superfine fibers to be drawn at speeds very much higher than had been possible before.

BRIEF DESCRIPTION OF THE DRAWINGS

These and other objects and features of the present invention will become apparent from the following detailed description which should now be read in conjunction with the accompanying, illustrative drawings, wherein:

FIG. 1 is an elevation view that shows schematically one form of experimental apparatus which embodies the present invention;

FIG. 1A is an elevation view taken in cross-section to show some of the detail of an injector device used in the apparatus of FIG. 1;

FIG. 2 is on the same page as FIG. 1 and is a graphical representation showing the velocity and pressure distribution in the stream of gas or vapour, during operation, taken lengthwise of the apparatus of FIG. 1;

FIG. 3 is a side elevation view, partly in section and showing one proposed arrangement for producing and collecting textile, and especially superfine continuous filaments in accordance with the present invention.

FIG. 4 is on the same page as FIGS. 1 and 2 and is an elevation view taken in section longitudinally to show schematically a proposed commercial arrangement embodied by the present invention;

FIG. 4A is an elevation view taken in section to show in part an arrangement for use in applying a bonding agent or other surface conditioner to the monofilament being drawn;

FIG. 5 is on the same page as FIG. 4A, and is an elevation view taken partly in section to illustrate one form of apparatus that can be used to produce a filamentized felt mat structure from one or more continuous fibers or monofilaments; and which is somewhat similar to the apparatus of FIG. 4.

FIG. 6 is a perspective view to show schematically another form of apparatus embodied by the present invention;

FIGS. 7A, 7B, 7C and 7D which all appear on the same page of drawings are, respectively, perspective views to illustrate schematically fragments of a glass reinforced plastic, with FIG. 7A representing such a plastic made from a chopped strand mat structure as is currently in use; while FIG. 7B represents such a plastic reinforced by a filamentized felt mat structure utilizing at least one continuous fiber or monofilament produced in accordance with the present invention; and FIGS. 7C and 7D are graphical representations of the stress concentrations in the laminate of FIGS. 7A and 7B, as tekan along lines 7C—7C and 7D—7D thereof, and FIG. 8 which appears on the same page of drawings as FIGS. 1, 2 and 4 is a side elevation view showing in part and somewhat schematically, further modifications that can be incorporated into the apparatus of FIGS. 1, 3, 3A, or 6, if one or both of a closed and sealed system was being used.

DESCRIPTION OF THE PREFERRED EMBODIMENTS

Figure 3A:
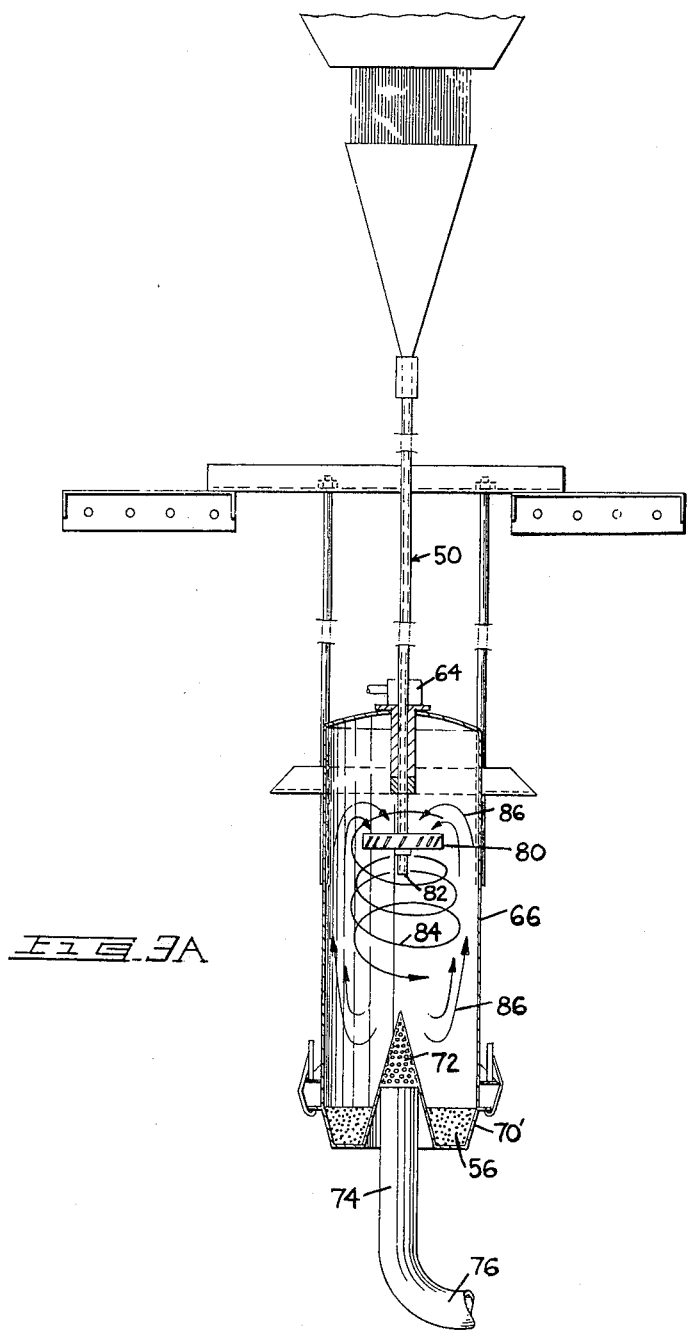
FIG. 3A is a side elevational view of a modified version of the apparatus of FIG. 3, taken partly in section.

It is particularly to be noted that although the foregoing has made reference especially to drawing continuous fibers or monofilaments of glass, the present invention is not to be limited to drawing continuous fibers of that material only. Within the spirit of this invention, the process and apparatus of the embodiments to be described below are applicable equally well to drawing continuous fibers from other organic and inorganic materials, and especially synthetic thermoplastic materials of the type that are currently known and used in the textile industry. It is expected, for example, that instead of using a silicate as the starting material, polyvinylchloride, nylon, rayon or other such materials could also be used. The reader should recognize, however, that because of the different temperature ranges at which the above materials become viscous liquids, certain adjustments will have to be made before the particular apparatus can successfully be used. It is well known, for instance, that silicate materials require a much higher temperature to be transformed into a viscous liquid, than do polyvinyl chloride, nylon, or other synthetic thermoplastic materials. Such changes and modifications as will be required when using different starting materials, will be apparent to those persons skilled in these arts.

Turning now to the drawings which are concerned with one preferred application of the present invention, namely, the drawing of continuous fibers or monofilaments of glass, FIG. 1 shows an experimental setup which is embodied in one aspect of the present invention. In FIG. 1 a drawing section or nozzle 10 of about two to three feet in length is shown to be provided with an inlet 12. In an experimental arrangement, this drawing nozzle 10 was made of glass tubing, whereas in actual practise, the drawing nozzle would be manufactured from a metal or a metal-coated material, preferably stainless steel. The inlet 12 flairs smoothly outwards in order to enable a laminar flow of fluid, (liquid or gaseous and usually the latter) to be established over at least the initial portion of the drawing nozzle 10. Moreover, this inlet 12 is disposed at a predetermined distance $d$ below a calibrated orifice 14 (known in the glass-making industry as a "bushing") that is provided on a conventional glass-making furnace. The structure and operation of a glass-making furnace is well known, per se, and need not be described at this time. It will suffice to state that such a furnace will be capable of transforming whatever starting material is being used, in this case a silicate, to a viscous liquid. The inlet 12 of the drawing nozzle 10 is integrally joined with a very smooth profile, i.e., with no discontinuities, to a body section 16 whose side walls are essentially vertically disposed, parallel to one another and parallel to the longitudinal axis of the nozzle 10. In this arrangement, the cross-sectional area of the drawing nozzle is essentially constant, however, other configurations could also be used. It is expected, for example, that the side walls of body section 16 could be oriented to provide a cross-sectional area which could either increase, or decrease, from the inlet 12 lengthwise of the drawing nozzle 10. Such other configurations for the side walls of body section 16 could be used in order to maintain a desired flow pattern within the fluid medium being used. In the apparatus of FIG. 1, the cross-sectional shape of the drawing nozzle 10 is circular, however, other shapes such as square or rectangular could also be used. Moreover, the cross-sectional area of the drawing nozzle 10 could be varied over a wide range, as noted previously. It is necessary only that the minimum diameter or spacing between any two opposite side walls is slightly larger than the greatest diameter of a bead which forms on the end of the glass fiber when it first falls from the calibrated orifice 14, following attainment of the correct drawing temperature for that material. We have found for example, that in the apparatus of FIG. 1, using a cylindrical glass tube as the drawing nozzle 10, a diameter of approximately ¼ inch provided an adequate clearance for the bead to pass through the drawing nozzle without contacting any of the side walls of the body section 16.

The end portion 18 opposite the inlet 12 is provided with an apparatus 20 whose construction is shown in more detail in FIG. 1A. This apparatus 20 is structurally similar to a conventional injector. As used in connection with the apparatus of FIG. 1, however, apparatus 20 was used only to apply sizing to the fiber being drawn. Hence, the large inlet 22 (in FIG. 1A) will be connected to a suitable supply of sizing. From inlet 22, the sizing is introduced into a chamber 24 that is annular, and from which chamber the sizing is drawn or tucked via the jet action of the interior jet nozzle 26, and dispensed to treat the surface of the continuous fiber being drawn. This apparatus 20 is integrally joined to a diffusor or hood section 30. This diffusor or hood section 30 is generally conical in section taken longitudinally of the same and will be generally circular in cross-section perpendicular to the longitudinal axis thereof. Collecting means in the form of a screen 32 is provided at the end of the hood section 30 opposite the apparatus 20, in order to collect and retain thereon a continuous fiber or monofilament 34 which is being drawn by the apparatus of FIG. 1. A suction box 36 is provided beneath the screen 32 and is operatively connected to a vacuum pump, suction fan or the like (not shown) which develops or generates a suction or reduced static pressure therein. The hood section 30 is in tight sealed engagement with the suction box 36, in this instance by means of clamped flanges 38 secured by bolts, clamps or the like. Other alternative sealing means could also be used. The reduced static pressure within the suction box 36 will also generate or develop a reduced static pressure within the diffusor section 30, with the result that a pressure differential is established over the length of the drawing nozzle 10. Because of this pressure differential and the fact that the inlet 12 is open to atmosphere, a moving stream of fluid will be set up. In this instance, the moving fluid is air. Since the inlet 12 is provided with a smoothly shaped contour and there are for all practical purposes no discontinuities over the initial portion of the drawing nozzle 10, the flow of gas indicated by arrows 40 will be laminar in form, at least over that initial portion of the drawing nozzle. The extent to which the flow remains laminar over the remaining portion of the drawing nozzle 10 will in part depend on the specific wall configuration being used, for example, parallel or tapered.

As stated previously, the inlet 12 to the drawing nozzle 10 has a predetermined, smoothly contoured shape. This shape is deliberately maintained free of any surface discontinuitites so as to ensure that the inflow of gas or vapour from the environment into the initial portion of the drawing nozzle 10 is laminar. The establishment of laminar flow over at least the initial portion of the drawing nozzle 10 is essential in order to ensure that the velocity and pressure distribution within the flow of gas is uniform in the inlet 12. Because the velocity and pressure distributions are uniform, there are no abrupt changes or gradients in either the pressure or velocity, which would tend to subject the delicate continuous fiber or monofilament 34 to forces having a tendency to break the same.

The provision of a laminar inflow to the drawing nozzle 10 is in decided contrast to techniques used in a number of present-day processes. It is known, for example, to introduce a jet of air from a suitable source under high pressure to be directed at a stream of liquid glass being drawn from the calibrated or "bushing" orifice. Because a positive pressure jet of air is very turbulent in nature, it immediately breaks up the fiber into staple fibers of a discrete length. Such fibers are of a form referred to in the glass-making art as "curly" and are used in the manufacture of blankets of insulating mineral wool. In contrast to that, the present invention is concerned with drawing a continuous fiber or monofilament and especially "Beta" or other types of textile fibers which are straight and not curly, by a moving fluid.

As noted previously, the inlet 12 to the drawing nozzle 10 is located a distance $d$ beneath the calibrated orifice 14 from which a continuous fiber is to be drawn. This distance $d$ can vary somewhat depending upon the exact structural configuration being used, as will become apparent from the description below. At this point, however, we should emphasize that the distance $d$ is sufficient to ensure that the continuous fiber or monofilament 34 is fully solidified and formed before the moving air stream (indicated by arrows 40) engages the monofilament and effects a frictionally generated pulling force thereon. We have found that with the apparatus of FIG. 1, in trial runs involving the drawing of continuous fibers of glass, a distance of approximately 17.8 cm is adequate. This distance can of course be much greater than that if desired. However, to use a distance very much greater than the minimum required to ensure that the continuous fiber is indeed fully solidified and formed, will expose that very thin and delicate monofilament to a tremendously increased hazard for breakage. Breakage of the monofilament is naturally undesirable since it restricts the rate of production of the textile fiber, and causes unnecessary and costly delays.

Thus, the apparatus of the invention provides means for the continuous application of a pulling force to the solidified fibre, at a substantially shorter distance from the supply of heat softened material than is possible with prior art mechanical pulling devices. This, in combination with the effects of the laminar air flow, further minimizes lateral vibrations of the solidified filament which can cause weakening and occasional breaks.

One particular experimental facility of the type illustrated in FIG. 1 was set up and operated in a manner which will now be described briefly. A laboratory type of glass-making furnace was used to bring some E-type textile glass marbles to a temperature of about 2200°F., to transform the glass to a viscous liquid. A vacuum pump was connected to the suction box 36 and when operated, it initially established a pressure differential over the length of the drawing nozzle 10 of approximatly 11.4 cm of mercury. When the correct operating temperature of about 2200°F. was reached, a molten bead of glass formed at the calibrated or "bushing" orifice 14, and fell of its own weight due to gravity into the drawing nozzle. There, the bead and attached fiber were accelerated to a drawing speed of approximately 88 meters per second (about 290 feet per second). With fiber actually being drawn into a monofilament in the drawing nozzle 10, the pressure drop longitudinally thereof rose to about 12.7 cm of mercury, indicative of the work being done by the air stream in pulling the monofilament. As mentioned previously, the nozzle inlet 12 was positioned approximately 17.8 cm below the calibrated orifice 14. This apparatus was operated under those conditions for 30 minutes. The monofilament drawn was collected upon the screen 32, weighed, average fiber diameter measured, and using that information, the fiber drawing speed was calculated to be the 88 meters per second previously mentioned. It is to be recognized that because of the skin friction drag generated by the moving air stream contacting the surface of the fiber, the actual drawing velocity of the monofilament will be someqhat less than the velocity of the air stream itself. In another experimental run using the apparatus of FIG. 1, a monofilament fiber of glass having a diameter of $2.5\mu$ (10/100,000 inch on the average) was continuously drawn over an eight-hour period of operation at a speed of about 150 meters per second (500 feet per second) with no breaks whatsoever occurring in the monofilament during that entire time. This drawing speed was calculated in the same manner as above.

It is to be emphasized that the rate of drawing monofilament or continuous fiber according to the present invention, can be varied. The rate of drawing continuous fiber is, moreover, basically a function of two opposing forces. The first, a positive force, is created by the pressure differential established over the length of the drawing nozzle, and this differential sets up the flow or moving stream of fluid. The presence of a monofilament or continuous fiber in the moving stream of fluid causes the latter to exert a fractionally generated pulling force on the monofilament. The frictional force is in the form of a skin friction drag, and it is this factor that causes a difference to exist in the actual velocities of the moving gas and the monofilement being drawn. The mechanics of how such a fractional pulling force is established does not itself form part of this invention. For present purposes, it is only necessary to recognize that such a frictional force is established and that it does indeed effect a pull on the monofilament being drawn. A change in any one of several of a number of factors will affect the magnitude of the positive, frictionally generated pulling force. A variation, for instance, in the diameter of the calibrated orifice and hence of the fiber (and the active surface area of the latter); in the pressure differential over the length of the nozzle and hence the rate of drawing; in the active length of the drawing nozzle and the velocity difference between the fiber and drawing fluid, taken either singly or in combination, will contribute to a change in this pulling force.

The second force, a negative or retarding force, depends upon the viscosity of the viscous liquid which constitutes the starting material, and the diameter of the calibrated orifice. A complex mathematical relationship exists in describing the various factors which make up this retarding force, and a detailed analysis of those factors is beyond the scope of the present application. For purposes of this invention, it will suffice to state simply that a more viscous starting material will require a greater pulling force to draw the monofilament at a constant rate, other parameters being constant. Alternatively, for a constant pulling force, a greater viscosity of the starting material will result in a decreased rate of drawing the continuous fiber. Generally speaking, changes in the viscosity of a starting material are primarily brought about by changing the temperature in the forehearth and calibrated orifice in the glass-making furnace. On the other hand, changing the chemical make-up of the starting material can also cause a change in the viscosity. For all practical purposes, however, the viscosity-temperature relationship of a starting material obtained from any particular source of supply is essentially fixed. It is far easier to stay with the starting material in its original form and composition, and if changes in viscosity are indeed wanted, alter the temperature at which the viscous liquid is to be drawn from the calibrated orifice. One would not usually wish to incur the extra expenses and delay associated with adding other chemical ingredients merely to change the viscosity of the starting material, while keeping the drawing temperature in the calibrated orifice relatively constant.

In the apparatus of FIG. 1, the inlet 12 to the drawing nozzle 10 is open to atmosphere, while the other end of the "system" is the suction box 36 which is connected to a vacuum pump not shown. As stated previously, the pressure differential established longitudinally over the length of the drawing nozzle causes a flow of fluid, usually a gas, through the nozzle. The mathematical relationship which exists between pressure and velocity in a moving stream of a gas is well known, and need not be discussed here. It is known, for instance, that the stagnation or total pressure in a moving stream of a gas is composed of two parts, the static pressure and the dynamic pressure. The static pressure is related to the pressure intensity of the gas when it is not moving, i.e., when undisturbed. On the other hand, dynamic pressure is related to the velocity of the moving stream of gas. Since there is no external application of pressure to the gas moving between the inlet 12 and the suction box 36, of FIG. 1, the total or stagnation pressure in the stream of moving gas wills stay substantially constant. However, since the stream of moving gas accelerates over the length of the drawing nozzle 10, the factors involved in each of the static and dynamic pressures will change. It will suffice to state simply that as the velocity of the moving gas increases, so too does the dynamic pressure component of the total or stagnation pressure, increase. Hence the static pressure component must decrease. A rough approximation of the relationship of static pressure and gas velocity in the air stream moving through the apparatus of FIG. 1 is illustrated graphically in FIG. 2. There, it will be seen that the static pressure decreases from ambient pressure, with the dynamic pressure and velocity being essentially zero just outside of the inlet 12, to a maximum amount of negative pressure or suction in the area of the apparatus 20, where gas velocity is at its maximum. From the area of the apparatus 20, the static pressure will once again rise, reaching the pressure drawn by the vacuum pump within the suction box 36. In a similar manner, the velocity of the moving stream of gas increases gradually over the length of the drawing nozzle 10, starting from the inlet 12 where it already has some velocity to a maximum again in the region of the apparatus 20. From here, the velocity falls off again quite rapidly within the diffusor or hood section 30. The velocity of the moving gas will not fall to zero in the suction box 36 because, in this instance, gas is continually being drawn out of the suction box by the vacuum pump in maintaining the suction or reduced static pressure therein.

FIGS. 3, 3A and 4 show embodiments which could be used commercially. In FIG. 3, a drawing funnel or nozzle 50 is used to draw a multiplicity of continuous fibers or filaments 52, while a collet assembly 54 enables these monofilaments 52 to be collected as a "cake" 56. As before, the drawing nozzle 50 has an inlet 58 which is smoothly contoured and integrally joined to a body section 60 in such a way that there are no discontinuities formed. The inlet 58 is located a distance $d$ beneath a multiplicity of calibrated orifices provided in the forehearth 62 of a conventional glass-making furnace. As it is known, there are several hundred calibrated orifices provided, with one continuous fiber or monofilament 52 being associated with each orifice. The body section 60 is associated with a sizing applicator 64 similar in structure and function as the apparatus 20 of FIG. 1 at the end of nozzle 50 opposite the inlet 58. The sizing applicator 64 is sealably connected to a diffusor hood or chamber 66 in whose lower end 68 the collet assembly 54 is provided. The end 68 is provided with a bulged portion 70 which defines a receiving area for the "cake" 56. This "cake" 56, as it is known in this art, is formed roughly in an annular form having a central opening. In other words, the "cake" 56 is roughly doughnut-shaped. Within the inner opening of the "cake" 56, a nose cone section 72 of the collet assembly 54 is disposed, to draw a suction or reduced static pressure within the hood or diffusor section 66. These nozzles 78 enable a blast of air to be introduced by means of its body section 74 and connecting line 76 to a vacuum pump, suction fan, or the like. In order to ensure that the monofilaments 52 have enough "swirling motion" within the hood section 66, a pair of oppositely disposed nozzles 78 are provided in the portion of hood section 66 adjacent the sizing applicator 64. These nozzles 78 enable a blast of air to be intoduced tangentially to the generally cylindrical cross-sectional form of the hood section 66, thereby ensuring that a swirling motion of the air flow within that section is established. Evacuation of the gas from within the hood section 66 by means of the perforated nose cone 72 ensures also that the flow of gas is generally downwards, as seen in FIG. 3. Because of the inertia of the monofilaments 52, and the swirling flow of gas within the hood section 66, these monofilaments can thus be collected in the form of the "cake" 56.

It is again to be emphasized that in the apparatus shown in FIG. 3, the inlet 58 is smoothly contoured and so formed as to ensure that a laminar flow of the moving gas or vapour is established. The apparatus of FIG. 3, and 3A as in FIG. 1, can be considered as an "open" system with air being the gas in question.

The apparatus of FIG. 3A is similar to structure and function to that of FIG. 3. There is one major difference, however, in that nozzles 78 in the latter drawing have been replaced by a vane assembly 80. This vane assembly 80 is slightly above the outlet 82 from the drawing nozzle, from which outlet the monofilament being drawn and drawing fluid are discharged. The "jet effect" of the fluid being discharged causes environmental air within the chamber 66 to be sucked or drawn down through the vanes of assembly 80. These vanes redirect the fluid flowing past the same and induce a swirling motion generally circumferentially and vertically of chamber 66. (See arrows 84, 86) In other words, the "jet effect" above causes a swirling of recirculated fluid in the chamber 66, both circumferentially of the chamber 66, as well as vertically. Such motion aids in laying down the monofilament being drawn as the "cake" 56.

The apparatus illustrated schematically in FIG. 4 shows a drawing nozzle 90 provided with a smoothly contoured inlet 92 that is again located a distance $d$ beneath at least one and preferably a multiplicity of calibrated orifices provided on a forehearth 94 of a conventional glass-making furnace. The drawing nozzle 90 can be rectangular in cross-section, being made up from a pair of plates or side walls that are spaced approximately ¼ inch apart. These side walls or plates make up the body section 96 of the drawing nozzle. Near the discharge end of the body section 96, a single or multi-stage injector unit 98 is provided. It is to be noted, however, that the injector unit 98 of FIG. 4 (shown in section in FIG. 1A) is connected to a suitable source of air under pressure so as to inject a jet of air at superatmospheric pressure conditions, thereby causing a suction to be generated in the inlet 92 to the drawing nozzle 90. The discharge end of the drawing nozzle 90 is connected to a hood section 100 that is disposed immediately above, but not sealed to an uppr run 102 of a collecting conveyor assembly 104. This collecting conveyor assembly 104 is conventional in construction and operation and need not be described in detail here. It is to be noted that since the injector unit 98 provides a jet of air under positive pressure, i.e., no suction boxes are associated with the collecting conveyor assembly 104, the hood section 100 need not be in tight sealed relationship to the top run 102 of the collecting conveyor. In other words, the monofilaments are collected at normal atmospheric pressure.

As a similar arrangement, a multiplicity of drawing nozzles 10 or 120 (of FIGS. 1 and 5) could be supported side by side and connected to a common hood section and suction box, to effect drawing many individual fibers. Since each nozzle draws a single monofilament, better control thereof will be possible. An injector in each nozzle would cause the fluid flow.

The jets of air under positive pressure as injected by units 98 into the lower end of the drawing nozzle 90 establish a pressure differential lengthwise of the drawing nozzle, and hence, cause a flow of moving gas to be set up in the same. Moreover, since the inlet 92 is smoothly contoured and free of virtually any surface discontinuities, a laminar flow of gas is established at least over the initial portion of the drawing nozzle 90. This laminar flow is indicated by arrows 106. The multiplicity of continuous fibers or monofilaments drawn by nozzle 90 are set down within the good section 100 onto the top run 102 of the collecting conveyor in the form of a filamentized felt mat 108. This filamentized felt mat 108 can subsequently be used in the glass-reinforced plastics industry, or other such industry where reinforcing of a matrix material is desired. It is to be noted that each of injector units 98 can also be used, if desired, to apply binder or conditioning agent to the continuous fibers or monofilaments being drawn, just prior to the latter being set down as the filamentized felt mat 108. Within the spirit of this invention, the filamentized felt mat 108 is made up from a multiplicity of continuous fibers or monofilaments that are of a reinforcing type of fiber. As described in connection with the apparatus of FIG. 1, the pressure in the source for pressurized air for the injectors 98 can be varied in order to change the velocity of the gas moving through drawing nozzle 90. Similarly, the temperature-viscosity relationship of the viscous liquid which constitutes the starting material can also be varied. In these ways, the drawing speed of the continuous fibers or monofilaments can be varied.

The apparatus indicated in FIG. 5 is yet a further modification of the basic apparatus shown in FIG. 1. Accordingly, a drawing nozzle 120 is provided with an inlet 122 that is smoothly contoured and free of any surface discontinuities. AA the discharge end of the drawing nozzle 120 is an injector 124 that is associated with the open top 130 of a diffusor or hood section 126. The top of the hood section 126 is provided with crossmembers 128 which support the drawing nozzle 120. A collecting conveyor shown at 132 is operatively associated with the lower and discharge end of the hood section 126. Provided beneath the upper run of the collecting conveyor 132 is a suction box 134 that is connected to a suitable suction fan, or the like. The apparatus of FIG. 5 is intended to be used in connection with an injector arrangement supplying a limited amount of air, and hence opening 130 provided in the top of the hood section 126 is required in order to enable an adequate air flow, drawn into the suction box 134 to enable a mat (not shown) being formed by collecting the continuous fiber, to be held down on the top run of the collecting conveyor 132. As in the embodiments previously described, the inlet 122 is disposed a predetermined distance $d$ which can be in the range from approximately 5 to 15 inches, beneath the calibrated orifice, in this instance, of a laboratory-type glass-making furnace.

Another suggested commercial arrangement that would embody the present invention is indicated in FIG. 6. There, a conventional glass-making furnace (not shown) is provided with a forehearth 140 on the underside of which there are provided several hundred calibrated or "bushing" orifices. A drawing nozzle 142 is positioned in alignment beneath the forehearth 140 and comprises side walls 144 in the form of two plates that are integrally interconnected by end walls 146. These plates are about two to three feet in length and extend in widths up to approximately 4 feet or more, depending upon the actual width of the reinforcing mat being produced. The calibrated orifices will also be adequate in number to be compatible with the width of mat being formed therefrom. In other words, continuous fibers collected at one location on the mat will be derived from orifices located immediately above that location, contrary to prior art systems where the fibers are produced in one central region and distributed in a side-to-side manner in forming the mat. Moreover, these plates 144 are spaced apart a distance of approximately ¼ inch. For convenience in fabrication, the side walls 144 and end walls 146 will usually be welded or otherwise joined together. The drawing nozzle 142 is provided with a flaired, smoothly contoured inlet 148 that is free of any surface discontinuities. The other end of the drawing nozzle 142 is connected to a diffusor section 150 that is conical in shape taken longitudinally thereof. This diffusor section 150 also comprises side walls and end walls which, for convenience, can simply be continuations of the side walls 144 and end walls 146 of drawing nozzle 142. A slot arrangement is provided within a housing 152 at the discharge end of the drawing nozzle 142 to apply an evenly distributed mist of a conditioning agent to the multiplicity of continuous fibers or monofilaments being drawn. This conditioning agent can be binder, sizing, a surface tension-reducing agent, or the like. This slot arrangement is shown in cross-section in FIG. 4A. There, the slot can be seen at 155, one formed in each of side walls 144. A butterfly damper 157 is pivotally disposed in each slot 155 and serves to cause the film-like mist to be formed and applied to the monofilaments. A suction box or chamber 154 is connected to the lower part of the diffusor section 150. This suction box 154 is then connected to a suction fan, or the like which operates to generate a suction or reduced static pressure with the suction box. One run 156 of a collecting conveyor of a construction well known in this art, passes through the suction box 154, in order to collect the multiplicity of continuous fibers or monofilamente as a filamentized felt mat 158. The end walls 146 together with a labyrinth seal arrangement 160 provided at the lower end of the diffusor section 150 function to effectively seal the suction box 154 and diffusor chamber from the higher ambient pressure outside. The precise structure for providing this sealed arrangement is known to those familiar with this art, and it will be recognized that in any given instance, one specific form could be more preferable than another.

As before, the inlet 148 to the drawing nozzle 142 is located or positioned a predetermined distance $d$ beneath the calibrated orifices of the forehearth 140. This distance will generally be in the range from about 5 inches to about 15 inches, with approximately 7 inches being preferred. Accordingly, the multiplicity of continuous fibers or monofilaments that are being drawn from the calibrated orifices will each be fully solidified and formed before the laminiar air flow in the inlet 148 engage the filaments and frictionally generates a pulling force thereon. As indicated earlier, the side walls 148 of the drawing section are spaced approximately ¼ of an inch apart, this distance being adquate only to ensure passage of the bead which forms on the end of the fiber when it initially falls from the calibrated orifice upon reaching its operating (or drawing) temperature. If there are several rows of calibrated orifices provided on the forehearth 140, then it will be appropriate to perhaps spread the side walls 144 apart a distance somewhat greater than that previously indicated. This could be achieved by a fixed structure or perhaps by adjustably movable side walls that could serve to vary the orientation of the walls as well. It is highly desirable to minimize the cross-sectional area of the drawing nozzle 142 following initial start-up, in order to keep the power requirements for the suction fans and like equipment to a reasonable magnitude. The multiplicity of continuous fibers or monofilaments that are drawn will have conditioning agent applied to the same by means of the slot arrangement under hood 152, just prior to those continuous fibers being collected and formed into the filamentized felt mat 158. Shortly after being formed, the raw filamentized felt mat 158 is conveyed to a curing oven 162 that might be heated by electricity, gas or other alternative source of energy. After it has been cured, the filamentized felt mat 158 is conveyed, for instance, to other equipment (not shown) where it is collected, on take-up rolls or the like. Such a filamentized felt mat can then be used in the glass-reinforced plastics industry or other such industry where reinforcing of a matrix material is desirable.

In connection with the apparatus of FIG. 6, as in the other embodiments already described, the furnace with which the drawing nozzle 142 is associated will be conventional in construction and operation, and serves to provide a supply of viscous liquid, at a temperature which is compatible with the particular starting material which is to be used. That is to say, if silicate material is being used, the furnace must be capable of transforming that material to a viscous liquid, i.e., at a temperature in the order of about 2200°F. As indicated previously, other starting materials could be used just as well, and should nylon, polyvinylchloride, or other such synthetic thermoplastic be used, then these too would be transformed to a viscous liquid since they have lower melting temperatures than a silicate.

In any event, because the process and apparatus embodied by the present invention are self-starting, as soon as the right temperature has been reached in the forehearth and calibrated orifice, a small bead or drop of glass (or other viscous starting material) will descend, being pulled by gravity and slowly entering into the area adjacent the inlet 148 to the drawing nozzle 142. In the inlet 148, this bead of starting material will encounter the laminar air flow and will be accelerated to the drawing speed of that material, for the particular parameters involved for the apparatus in question. In other words, for a given amount of suction or reduced static pressure within the suction box 154 and diffusor chamber 150, coupled with a particular temperature and hence viscosity of the viscous liquid from which the continuous fibers are to be drawn, coupled with calibrated orifices having predetermined diameter, a certain drawing speed will pertain. It is a particularly advantageous feature of this invention to be able to establish in the drawing nozzle 142 or other drawing nozzles previously described herein, a moving stream of gas, usually air, that has a very high velocity. Apparatus according to the present invention, such as that particularly shown in FIG. 6 has no mechanical pulling devices such as take-up reels or collets such as are used in prior art arrangements now in operation. Indeed, drawings speeds which are at least two to three times faster than in conventional drawing processes, espectially for reinforcement, textile, and particularly superfine textile filaments can be achieved in accordance with the present invention. Accordingly, it is envisaged that the present apparatus and process will function satisfactorily to provide drawing speeds which are as high as about 0.9 Mach. In other words, we expect that drawing speeds in the order of 90% of the speed of sound can be obtained. As will be fully recognized by those skilled in this art, such drawing speeds represent a very significant improvement over current drawing speeds.

Another advantage to be gained by apparatus of the type described herein, and especially as indicated in FIG. 6, is a self-compensating capability when a multiplicity of continuous fibers or monofilaments are being drawn. The reason for this self-compensating capability will be apparent from a brief consideration of the pressure and velocity distributions for laminar flow between two flat parallel plates. Such a situation exists, for example, within the drawing nozzle 142. It is well known that laminar flow between two flat parallel plates possesses a generally parabolic velocity distribution. That is to say, the velocity immediately adjacent the surfaces of the side walls 148 will be virtually zero, and will rise in a parabolic manner to a maximun value in the central portion of the drawing nozzle. As previously discussed, the total or stagnation pressure over the length of the drawing nozzle 142 will be approximately constant. Hence, as the velocity increases so will the dynamic pressure increase, at the sake of decreasing the static pressure. Hence, as the dynamic pressure increases with a rise in the velocity of the moving stream of gas, so it will be that the static pressure decreases. It will be recognized that on a much smaller scale, the presence of numerous continuous fibers or monofilaments in the air stream will, because such fibers are travelling at a lower velocity than the air itself, establish similar velocity and pressure gradients from one fiber to the next, or between one fiber and the side walls 148. Since a higher static pressure is found in an area where the velocity is low, movement of a continuous fiber towards another fiber or towards one of the side walls 148 will establish an imbalance in the pressure distribution. Hence, a pressure differential will be established, tending to push the fiber back to a region of lower static pressure, i.e., more centrally of the bounding "surfaces." It is for this reason, therefore, that even though very large numbers of continuous fibers or monofilaments might be drawn simultaneously, virtually no entanglement or contact between these monofilaments is expected to occur.

Further advantages which accrue from the present invention can be explained with reference to FIG. 6 and FIG. 7A to 7D. Using the apparatus of FIG. 6, a filamentized felt mat 158 is laid down, and is made up from a multiplicity of continuous fibers or monofilaments that have been drawn using the nozzle 142. After the continuous fibers or monofilaments have been coated with a sizing or coupling agent, binder, or surface tension-reducing agent, they are then laid down in an overlapping circular and continuously random pattern, directly onto the upper run of the collecting conveyor 156. The suction or reduced static pressure within the suction box 154 will hold the filamentized felt mat in place, and assist in formation of the same.

It might be appropriate to digress briefly at this point to make reference to the type of reinforced plastic material indicated in FIG. 7A. There, a piece of material 200 is shown as being made up from a resinous matrix material 202 in which a chopped strand mat struture was embedded, the latter comprising chopped strands 204 of a discrete length, usually about 2 inches. The stable fibers in the chopped strands 204 and the chopped strands themselves are not distributed homogeneously throughout the matrix material 202. As a result the individual fibers which make up the strands 204 will be found in pockets or concentrated regions within that matrix material. Accordingly, when a panel, for instance, has been made up from a reinforced plastic material employing a chopped strand mat structure, it will contain many fibers and strands of a discrete length, with the ends of such strands and fibers being sources of stress concentrations. See the graphical representation of that in FIG. 7C. The stress concentrations arise because the fibers are not continuous, and hence, any load which is applied to the plastic material 200 is not uniformly taken up by the reinforcing material and the matrix material 202.

In contrast to the reinforced plastic material 200 as made up from a chopped strand mat structure, a similarly reinforced material 210 (FIG. 7B) includes a filamentized felt mat consisting of continuous fibers or monofilaments 212 set down uniformly in a matrix of resinous material 214. Because the monofilaments which make up the filamentized felt mat 212 are continuous, a very good "wetting out" due to good capillary effects of the resinous matrix material 214 is obtained. Moreover, the individual monofilaments are very uniformly distributed in the filamentized felt mat. Hence. any load that is applied to the reinforced plastic material 210 will be evenly and uniformly taken up by the filamentary reinforcing material 212, i.e., the the continuous fibers or monofilaments, which possess a materially greater strength capability than does the resinous matrix material 214. With such a make up, virtually no stress concentrations will arise, with the result that significantly improved durability and strength properties are obtained. Using a continuous fiber or monofilament laid down in a random pattern, we have found that in the filamentized felt mat itself, the continuous fibers hold together better due to a certain interlocking effect. This also gives the filamentized felt mat a slight stretchability. Such a property is of commercial value because in a process of die pressing a laminate, there would be no tendency for the continuous fibers to be pulled apart and cause, for example, fiberless corner spots such as could and does occur using a chopped strand mat structure as the reinforcing.

FIG. 8 illustrates yet another variation to the basic apparatus illustrated either in FIGS. 3, 4 or 6. FIG. 8 shows a conventional forehearth 230 on which at least one bushing 232 is provided. Located immediately below the forehearth 230 and surrounding the bushings 232 is a pressure chamber 234 whose bottom surface 236 is integrally connected to the inlet of a drawing nozzle 238. That drawing nozzle 238 could be essentially identical to either the drawing nozzle 50 of FIGS. 3 or 3A, or the drawing nozzle 142 of FIG. 6. It should particularly be noted that the drawing nozzle 238 is associated with a diffusor chamber and a suction box, not shown here, which are completely closed to the atmosphere. In other words, the suction fan which generates the negative pressure in the suction box and diffusor chamber has its delivery side connected to a conduit 240 shown in FIG. 8, which leads into the pressure chamber 234. The reader should note that the spacing between the side walls that make up the drawing nozle 238 is considerably exaggerated in FIG. 8. In reality, the dimensions of the inlet to the drawing section 238 are very much smaller than the relative dimensions of the pressure chamber 234. As a result, the inflow of gas or vapour though the conduit 240 establishes a positive pressure above atmospheric within pressure chamber 234. Hence, the positive pressure in the chamber 234 coupled with the negative pressure provided in the suction box and diffusor chamber associated with the drawing nozzle 238 establishes a pressure differential longitudinally of the drawing nozzle. This causes a moving stream of fluid (liquid, gas or vapour) to be established. As in the apparatus previously described, the inlet to the drawing nozzle 238 is very smoothly formed so as to enable laminar flow to be established. Moreover, the lower surface 236 of the pressure chamber 234 will be spaced, as before, a sufficient distance below the orifice of the bushing 232 as to ensure that the monofilament fiber is fully solified and formed before the laminar flow exerts a net pulling force on the same. Side walls 242 are provided on the pressure chamber 234 and can either be sealed to the bottom of the forehearth 230, or alternatively, can be close to, but not actually sealed therewith. In the arrangement illustrated in FIG. 8, the pressure chamber 234 is not actually in sealed engagement with the lower surface of the forehearth 230. Hence, the pressure within the chamber 234 is not quite as high as it would be if sealed engagement was involved. The ghosted lines 244 show the extra depth of viscous liquid required in the bushing 232 when used on connection with the pressure chamber 234. This extra depth establishes an additional head indicated by $\Delta h$ of (molten) starting material which is required to offset the increased positive pressure in the chamber 234. If the chamber 234 were actually sealed to the forehearth 230, a further or greater $\Delta h$ or head would be required since the static pressure within the pressure chamber 234 would be even greater since there would be no loss to atmosphere.

The arrangement illustrated in FIG. 8 is representative of what might be considered as a "closed system". Using such a system, it would be possible to use a fluid, i.e., a liquid, or gas or vapour which is something other than air, for example, steam, or some other gas or a suitable liquid such as water, which is chemically inert with respect to the composition of the monofilament fibers being drawn, or which will achieve a chemical treatment of the filament itself to improve certain desired qualities. Further to that, it is to be recognized that using a closed system it would be possible to eliminate any dust or other extraneous material therefrom which would otherwise tend to cause tiny scratches on the surface of the monofilament fibers. Such scratches could in the worst case, raise stress concentrations that would weaken or reduce the strength properties of such a fiber. In other words, a controlled atmosphere could be used in such a system, in which the binder or sizing agent could also be dispersed within the gas so as to eliminate the need for a separate application thereof.

Finally, it might be possible to provide some means by which a heated zone is provided for example, by radiant energy, either in or downstream of the drawing nozzle. That heated zone could be used to improve or refine the qualities of glass, or other such material from which the monofilament fibers are made. Such a refinement step might be analogous to the process of "tempering" steel.

The foregoing disclosure has described preferred embodiments of apparatus and processes according to the present invention. In addition, several modifications have also been suggested, within the spirit of this invention. All such embodiments and modifications as will be apparent to those skilled in this art are therefore to be comprehended within the scope of the claims below.

I claim:

1. Apparatus for drawing a continuous unbroken relatively thin fiber the thickness of which is of the order of 10/100,000 of an inch, said apparatus comprising:
   a. means for supplying a heat softened stream of material;
   b. a drawing funnel having an upstream section and a downstream elongated pulling section;
   c. said funnel being positioned downstream from said supply to receive a fiber therefrom;
   d. means to produce a laminar flow of a gas through said funnel including means for establishing a pressure differential over the length of the funnel;
   e. said means for producing laminar flow further including an aerodynamically smoothly converging inlet for accelerating the laminar gas flow to establish a velocity exceeding the velocity of the continuous fiber, whereby the velocity differential causing said flow to remain laminar in said elongated pulling section generates a frictionally developed pulling force exerted on the fiber;
   f. means for solidifying the drawn fiber comprising a spacing of the inlet portion of said funnel from the outlet portion of said means for supplying a heat softened stream by a distance of 5 to 15 inches, whereby said frictionally developed pulling force is exerted on a fully formed solidified portion of said fiber to attenuate said heat softened stream with the heat softened stream being free of said frictionally developed pulling force.

2. The apparatus of claim 1 including means for collecting the attenuated fiber.

3. Apparatus for drawing a continuous unbroken relatively thin fiber the thickness of which is of the order of 10/100,000 of an inch, said apparatus comprising:
   a. furnace means for supplying a heat softened stream of material, including a calibrated orifice from which said stream is discharged;
   b. a drawing funnel having an upstream inlet section and a downstream elongated pulling section of substantially constant cross-sectional area;
   c. said funnel being positioned downstream from said orifice to receive a fiber therefrom, at which the fiber is fully formed and solidified;
   d. means to produce a laminar flow of a gas through said funnel including means for establishing a pressure differential over the length of the funnel;
   e. said means for producing laminar flow further including an aerodynamically smoothly converging inlet for accelerating the laminar gas flow to establish a velocity exceeding the velocity of the continuous fiber, whereby the velocity differential causing said flow to remain laminar in said elongated pulling section generates a frictionally developed pulling force exerted on the fiber;
   f. means for solidifying the drawn fiber comprising a spacing of the inlet portion of said funnel from said orifice by a distance of 5 to 15 inches, whereby said frictionally developed pulling force is exerted on a fully formed solidified portion of said fiber to attenuate said heat softened stream with the heat softened stream being free of said frictionally developed pulling force.

4. The apparatus defined in claim 1, wherein the elongated pulling section is configured to provide substantially constant velocity of the gas flow over the length thereof.

5. The apparatus defined in claim 1, wherein the elongated pulling section has a substantially constant cross sectional area over the length thereof.

6. The apparatus defined in claim 1, wherein there is provided a diffusor section joined to the discharge end of the elongated pulling section for decelerating the gaseous flow and fiber thereby allowing collecting of the attentuated fiber in a predetermined form.

7. The apparatus defined in claim 2, wherein said means for collecting includes a mechanism operative to collect the fiber as a roving.

8. The apparatus defined in claim 2, wherein said means for collecting includes a mechanism operative to collect the continuous fiber as a monofilament mat.

9. The apparatus defined in claim 1, wherein there is provided a plurality of calibrated orifices, each orifice being operable to discharge a heat softened stream of said fiber forming material, and wherein said drawing funnel is configured to receive the plurality of heat softened streams from said orifices.

10. The apparatus defined in claim 4, wherein there is provided a plurality of calibrated orifices, each orifice being operable to discharge a heat softened stream of said fiber forming material, and wherein said drawing funnel is configured to receive the plurality of heat softened streams from said orifices.

11. The apparatus defined in claim 5, wherein there is provided a plurality of calibrated orifices, each orifice being operable to discharge a heat softened stream of said fiber forming material, and wherein said drawing funnel is configured to receive the plurality of heat softened streams from said orifices.

12. The apparatus defined in claim 3, wherein there is provided a plurality of calibrated orifices, each orifice being operable to discharge a heat softened stream of said fiber forming material, and wherein said drawing funnel is configured to receive the plurality of heat softened streams from said orifices.

* * * * *